United States Patent
Ishikawa

[19]

[11] Patent Number: 5,975,331
[45] Date of Patent: Nov. 2, 1999

[54] FUEL TANK COMPRISING A SEPARATOR FILM

[75] Inventor: Takashi Ishikawa, Okazaki, Japan

[73] Assignee: Toyota Jidosha Kabushiki Kaisha, Toyota, Japan

[21] Appl. No.: 08/994,747

[22] Filed: Dec. 19, 1997

[30] Foreign Application Priority Data

| Dec. 26, 1996 | [JP] | Japan | 8-347505 |
| Jan. 14, 1997 | [JP] | Japan | 9-004440 |
| Jan. 17, 1997 | [JP] | Japan | 9-006836 |

[51] Int. Cl.⁶ ........................................ B65D 88/12
[52] U.S. Cl. ..................... 220/564; 220/530; 220/720
[58] Field of Search ................................ 220/562, 563, 220/564, 530, 529, 666, 720, 9.1; 141/236, 102; 123/516

[56] References Cited

U.S. PATENT DOCUMENTS

| 2,378,467 | 6/1945 | De Kiss | 220/721 |
| 3,347,406 | 10/1967 | Katzenmeyer | 220/530 |
| 3,617,034 | 11/1971 | Skinner . | |
| 3,693,825 | 9/1972 | Richman . | |
| 3,701,540 | 10/1972 | Pringle . | |
| 3,931,907 | 1/1976 | Henle | 220/530 |
| 3,949,720 | 4/1976 | Zipprich et al. . | |
| 3,968,896 | 7/1976 | Giacoletti et al. . | |
| 3,977,379 | 8/1976 | Weissenbach . | |
| 4,852,765 | 8/1989 | Lyzohub . | |
| 4,880,135 | 11/1989 | Neou | 220/721 |
| 5,056,493 | 10/1991 | Holzer . | |
| 5,421,383 | 6/1995 | Schmid | 141/236 |

FOREIGN PATENT DOCUMENTS

| 1 008 134 | 5/1957 | Germany . |
| 60-157427 U | 10/1985 | Japan . |
| 60-158922 U | 10/1985 | Japan . |
| 60-158923 U | 10/1985 | Japan . |
| 64-16426 | 1/1989 | Japan . |
| 7-132738 | 5/1995 | Japan . |
| 2 281 726 | 3/1995 | United Kingdom . |

*Primary Examiner*—Stephen Castellano
*Attorney, Agent, or Firm*—Oliff & Berridge, PLC

[57] ABSTRACT

According to the present invention, there is provided a fuel tank comprising a separator wall which separates an interior of the fuel tank into an air chamber and a fuel chamber. The separator wall is deformed according to an amount of fuel in the fuel chamber while the separator wall is in contact with a surface of the fuel in the fuel chamber. Further, the tank comprises fuel flow restricting elements extending within the fuel chamber to suppress movement of the fuel in fuel tank.

10 Claims, 18 Drawing Sheets

FUEL TANK COMPRISING A SEPARATOR FILM

BACKGROUND OF THE INVENTION

1. Field of the Invention

The invention relates to a fuel tank comprising a separator film.

2. Description of the Related Art

In order to prevent fuel vapor produced in a fuel tank from being discharged to the atmosphere, a charcoal canister containing activated carbon is connected to an engine. The vapor in a space above the surface of the fuel stored in the tank is introduced into the canister and is adsorbed on the activated carbon thereof. A large amount of the vapor, introduced into the canister, needs a large canister. Therefore, it is preferable to minimize the amount of the vapor produced in the tank in order to reduce the size of the canister.

In order to minimize the amount of vapor produced in the tank, a fuel tank which comprises a fuel-impermeable separator film in an interior of the tank, as disclosed in Japanese Unexamined Utility Model Publication No. 60-158923, has been developed. The film is in contact with the surface of the fuel in the tank to reduce the space above the fuel surface and moves up and down with the movement of the fuel surface. The small space above the fuel surface leads to a small amount of vapor being produced in the tank.

In the tank described above, if the fuel moves or oscillates in the fuel chamber, the separator film moves. As a result, the separator film may be broken.

Therefore, the object of the invention is to provide a tank, comprising a separator film, which is designed to prevent the separator film from being broken.

SUMMARY OF THE INVENTION

According to the invention, provision is made of a fuel tank comprising: a separator wall which separates an interior of the fuel tank into an air chamber and a fuel chamber, the separator wall being deformed according to an amount of fuel in the fuel chamber while the separator wall is held in contact with a surface of the fuel in the fuel chamber; and a fuel flow restricting element extending within the fuel chamber to suppress the movement of the fuel in the fuel tank.

Further, according to the invention, the fuel flow restricting element is comprised of a restricting wall spread in the fuel chamber to separate the fuel chamber into an upper fuel volume and a lower fuel volume.

Further, according to the invention, the restricting wall is comprised of a restricting film.

Further, according to the invention, the restricting film has pores therein.

Further, according to the invention, a refuel pipe is connected to the fuel chamber to supply the fuel chamber with fuel, and the restricting film has at least one opening larger than a pore at a portion thereof near the opening of the refuel pipe.

Further, according to the invention, the fuel flow restricting element is comprised of a flat plate.

Further, according to the invention, the plate is supported on the fuel tank by at least one spring.

According to the invention, provision is made of a fuel tank comprising: a separator wall which separates an interior of the fuel tank into an air chamber and a fuel chamber, the separator wall being deformed according to an amount of fuel in the fuel chamber while the separator wall is held in contact with fuel surface of the fuel in the fuel chamber; and deformation suppressing means attached to the separator wall on the fuel chamber side.

Further, according to the invention, the separator wall has a corrugated portion at a peripheral portion thereof, and the deformation suppressing means is attached to the corrugated portion of the separator wall.

Further, according to the invention, the deformation suppressing means is comprised of an urethane foam body.

Further, according to the invention, the deformation suppressing means is comprised of at least one fin depending from the separator wall into the fuel chamber.

According to the invention, provision is made of a fuel tank comprising a separator wall which separates an interior of the fuel tank into an air chamber and a fuel chamber, the separator wall being deformed according to the amount of fuel in the fuel chamber while the separator wall is held in contact with fuel surface of the fuel in the fuel chamber, a refuel pipe connected to the fuel chamber to supply the fuel chamber with fuel, and a fuel flow changing element for changing the direction of a flow of the fuel fed from the refuel pipe.

Further, according to the invention, the fuel flow changing element has an introduction pipe connected to the refuel pipe, and the introduction pipe introduces the fuel fed from the refuel pipe into the fuel chamber in a direction parallel with a face of the separator wall.

Further, according to the invention, the introduction pipe comprises a multi-opening portion at a opening thereof on the fuel chamber side, and the multi-opening portion introduces and dispenses the fuel fed from the refuel pipe into the face chamber in the direction parallel with the separator wall.

Further, according to the invention, the fuel flow changing element is comprised of at least one plate arranged near an opening of the refuel pipe on the fuel chamber side, and the plate introduces the fuel fed from the refuel pipe into the fuel chamber in a direction parallel with the separator wall.

Further, according to the invention, the fuel flow changing element is comprised of at least one groove formed in a bottom wall of the fuel tank, the groove extends from a portion of the bottom wall near an opening of the refuel pipe on the fuel chamber side to a portion of the bottom wall away from the opening of the refuel pipe, and the groove introduces the fuel fed from the refuel pipe into the fuel chamber in a direction parallel with the separator wall.

Further, according to the invention, the groove becomes deeper away from the portion of the bottom wall near the opening of the refuel pipe.

According to the invention, provision is made of a fuel tank comprising a separator wall which separates an interior of the fuel tank into an air chamber and a fuel chamber, the separator wall being deformed according to the amount of fuel in the fuel chamber while the separator wall is held in contact with fuel surface of the fuel in the fuel chamber, the separator wall having a corrugated portion at a peripheral portion thereof and deformation control means arranged on the corrugated portion of the separator wall for controlling the deformation of the corrugated portion of the separator wall.

Further, according to the invention, the deformation control means is comprised of reinforcing members, each of which extends along the corrugated portion of the separator wall.

Further, according to the invention, the reinforcing members are connected to each other by bridge elements which are resilient to make the reinforcing members move relative to each other.

Further, according to the invention, the reinforcing members move in the direction of the increase and decrease of the amount of fuel in the fuel chamber.

The present invention may be more fully understood from the description of the preferred embodiments of the invention set forth below, together with the accompanying drawings.

DESCRIPTION OF THE PREFERRED EMBODIMENTS

A fuel tank, according to the first embodiment will be explained, referring to FIGS. 1 and 2.

Figure 1:
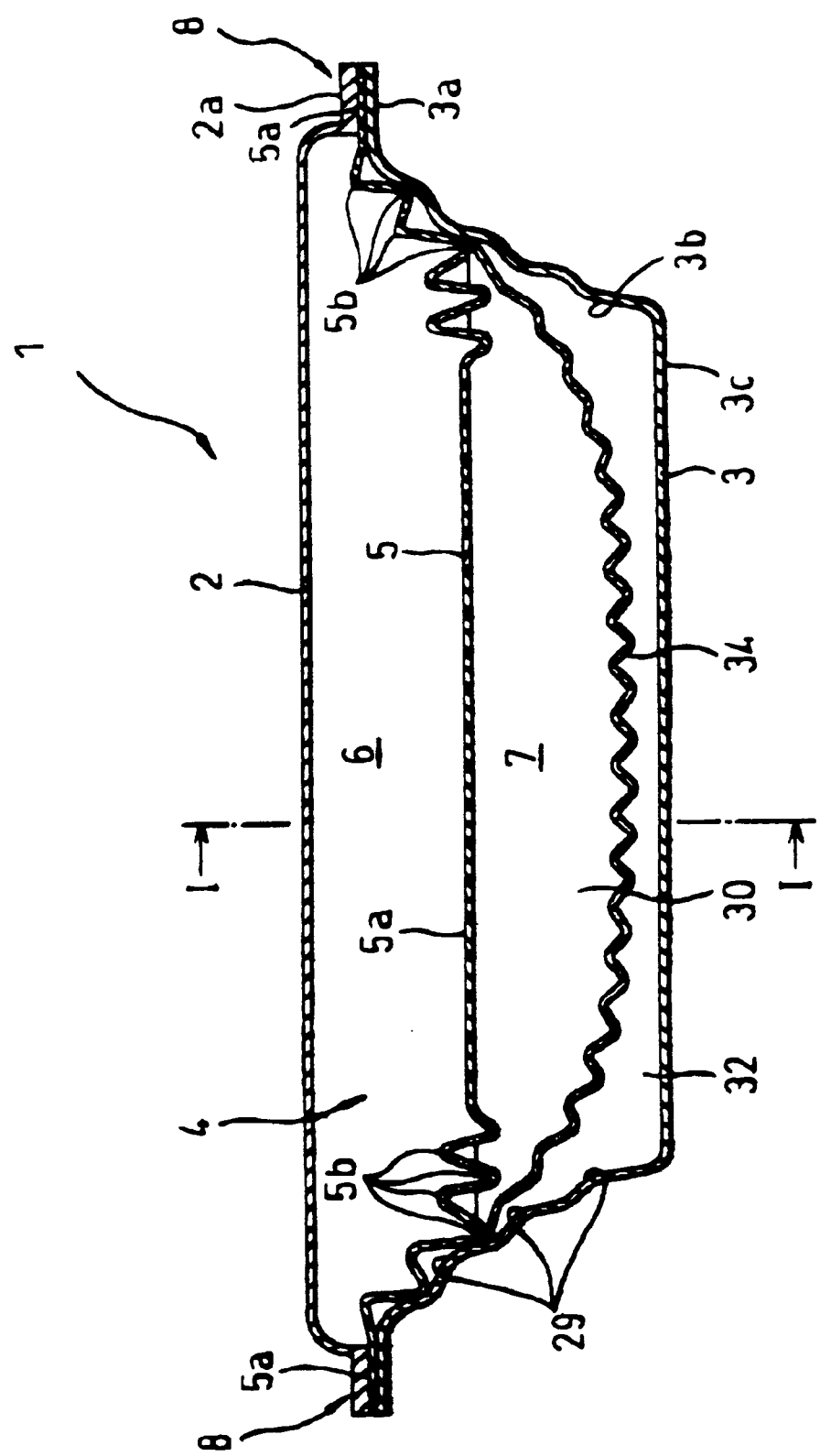
FIG. 1 is a side view of a fuel tank according to the first embodiment of the invention.
Figure 2:
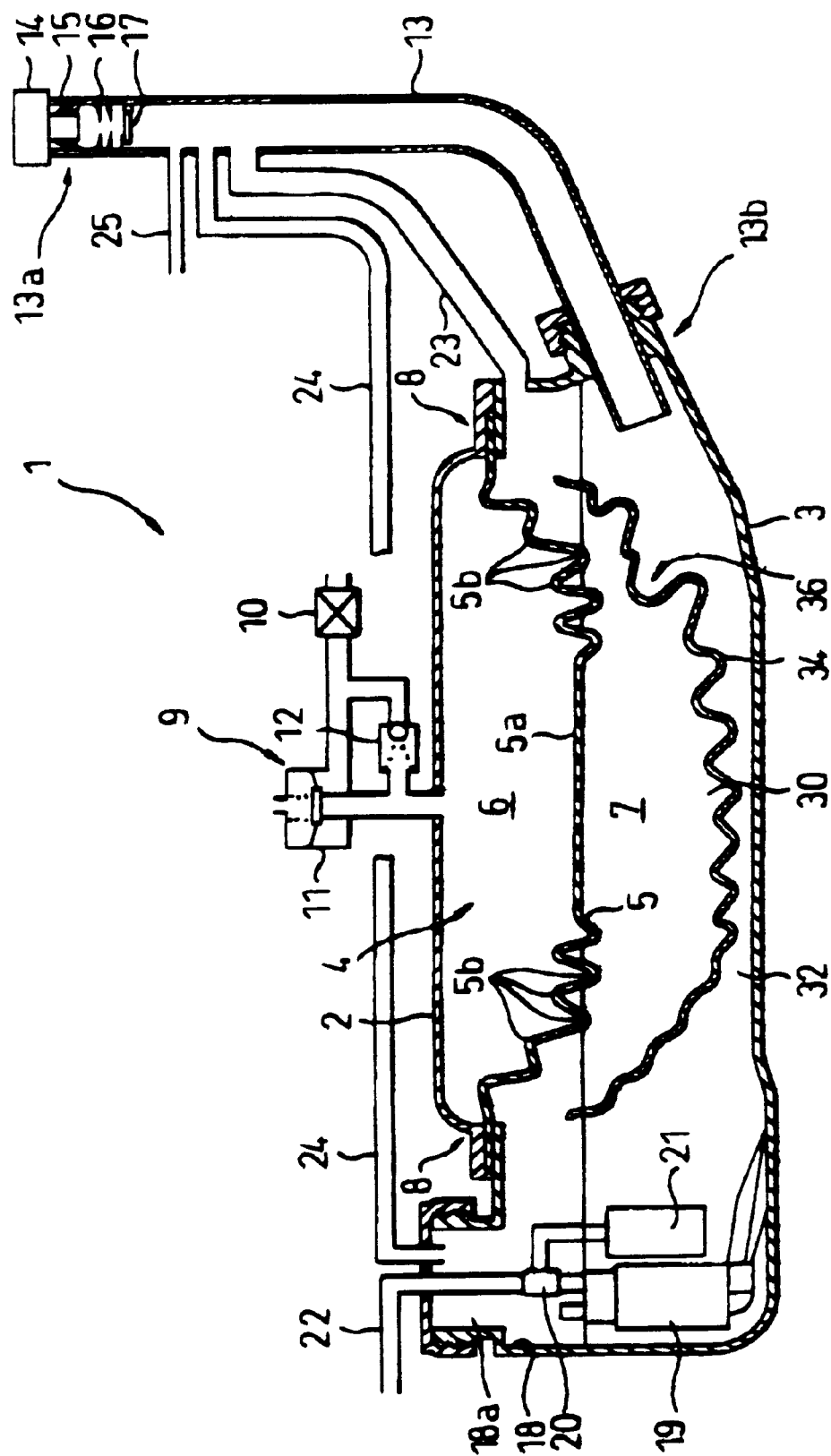
FIG. 2 is a cross sectional view of a fuel tank according to the first embodiment of the invention along the line I—I in FIG. 1.

Referring to FIGS. 1 and 2, a fuel tank 1 of a vehicle comprises an upper portion 2 and a lower portion 3 which are made of material such as metal or synthetic resin. These portions 2 and 3 are sealingly connected to each other at their flange portion 2a, 3a. A separator wall or film 5, which is made of material such as polyethylene or nylon having flexibility and fuel-impermeability, is positioned in an interior 4 defined by the upper and lower portions 2 and 3. The film 5 separates the interior 4 into an upper air camber 6 and a lower fuel chamber 7. A peripheral portion 5a of the film 5 is sealingly connected to a side wall 3b of an inner wall of the tank 1 at a mounting portion 8. Therefore, the peripheral portion 5a of the film 5 is entirely held between the upper and lower portions 2 and 3. The film 5 comprises, at the peripheral portion thereof, a plurality of annular corrugated portions 5b which are generally concentric with each other. The corrugated portions 5b are regularly spaced apart from each other. Thus, the longitudinal cross section of the film 5 is in the form of wave. The film 5 is deformable or can be bent along the corrugated portions 5b. As a result, the central portion 5a of the film 5 can move up and down with the movement of the surface of the fuel (hereinafter referred to as the "fuel surface") in the fuel chamber 7 with the central portion 5a of the film 5 being in sealed contact with the fuel surface.

Referring to FIG. 2, the air chamber 6 is in communication with the atmosphere via an air chamber pressure control valve (hereinafter referred to as the "ACP control valve") 9 and an air cleaner 10. The ACP control valve 9 controls the pressure in the air chamber 6 (hereinafter referred to as the "air chamber pressure"), and comprises a positive pressure relief valve (hereinafter referred to as the "PP relief valve") 11 and a negative pressure relief valve (hereinafter referred to as the "NP relief valve") 12. The PP relief valve 11 opens when the air chamber pressure exceeds a predetermined positive pressure. The NP relief valve 12 opens when the air chamber pressure becomes lower than a predetermined negative pressure. Therefore, the air chamber pressure is kept at the pressure between the predetermined positive and negative pressures.

Referring to FIG. 2, a refuel pipe 13 is sealingly connected to the fuel chamber 7. A refuel pipe cap 14 is removably attached to an upper opening 13a of the pipe 13. Seal members 15 and 16, and a vapor shut-off valve 17 are positioned in the pipe 13 adjacent to the opening 13a thereof. The seal member 15 is in contact with an outer periphery of the cap 14 when the cap 14 is attached to the opening 13a of the pipe 13. The seal member 16 is in contact with an outer periphery of a fuel nozzle (not shown) inserted into the pipe 13 during the refueling operation. The vapor shut-off valve 17 is biased by a spring (not shown) to normally close the pipe 13 and to prevent fuel vapor from being discharged from the pipe 13 to the atmosphere.

Referring to FIG. 2, the fuel chamber 7 comprises a fuel pump chamber 18 defined by the lower portion 3 protruding outwardly from the flange portion 2a of the upper portion 2. A fuel pump 19, a fuel pressure regulator 20 and a fuel filter 21 are positioned in the pump chamber 18. The regulator 20 regulates the pressure of fuel pumped by the pump 19. The fuel regulated is fed to fuel injectors (not shown) via a fuel feeding pipe 22. In the first embodiment, the regulator 20 is positioned in the pump chamber 18 which is in communication with the fuel chamber 7 so that a fuel return passage, which extends to the tank 1 from a fuel dispensing pipe (not shown) for dispensing fuel from the fuel feeding pipe 22 to each fuel injector, can be eliminated. Further, there is no possibility that fuel which includes fuel vapor, generated by heat around a cylinder head (not shown), returns to the tank 1. Therefore, the amount of vapor in the tank 1 is kept small. Further, in the first embodiment, the pump 19 is positioned in the tank 1 so that noise discharged therefrom to the outside of the tank 1 is kept low.

Referring to FIG. 2, a circulation pipe 23 is connected to the upper portion 2 of the tank 1 and the refuel pipe 13. The circulation pipe 23 at one end thereof is open to the fuel chamber 7 under the mounting portion 8, and at the other end thereof is open to an upper portion of the refuel pipe 13 above a lower opening portion 13b of the refuel pipe 13. Therefore, during the refueling operation, an air in a volume between the film 5 and the fuel surface can flow through the circulation pipe 23 from the fuel chamber 7 to the upper portion of the refuel pipe 13 so that the refueling operation can be easily carried out. Further, during the refueling operation, vapor in the fuel chamber 7 is discharged to the refuel pipe 13 via the circulation pipe 23.

Referring to FIG. 2, a fuel vapor pipe 24 is connected to the upper wall of the pump chamber 18 and the refuel pipe 13. The fuel vapor pipe 24 at one end thereof is open to an upper volume of the pump chamber 18, and at the other end thereof is open to the upper portion of the refuel pipe 13 above the other end opening of the circulation pipe 23. A vapor purge pipe 25 is connected to the refuel pipe 13. The vapor purge pipe 25 is open to the upper portion of the refuel pipe 13 above the other end opening of the fuel vapor pipe 24. Further, the vapor purge pipe 25 is connected to a charcoal canister (not shown) which comprises activated carbon and adsorbs fuel vapor thereon. Therefore, vapor in the pump chamber 18 as well as the fuel chamber 7 is discharged to the refuel pipe 13 via the fuel vapor pipe 24. Further, the vapor in the refuel pipe 13 is discharged to the canister to prevent the vapor from being discharged to the atmosphere. The vapor adsorbed on the canister is purged to an intake pipe of an engine (not shown), depending the engine driving conditions such as an engine load.

It is not preferable that the film 5 oscillates in the direction of the oscillation of the fuel in the fuel chamber 7 due to the acceleration or turning of the vehicle. The oscillation of the fuel in the fuel chamber 7 places a large load and stress on the film 5. In the first embodiment, referring to FIG. 1, a side wall 3b of the lower portion 3 is inclined inwardly from the flange portion 3a to a bottom wall 3c of the lower portion 3 so that the film 5 which projects downwardly can be in contact with the side wall 3b. Therefore, the movement or oscillation of the film 5, to a large extent, is suppressed independently of the fuel level in the tank 1 by the inclined side wall 3b. Further, the side wall 3b comprises a plurality of annular projections 29 which project inwardly. Therefore, the side wall 3b has a step-shape cross section to reinforce the side wall 3b without any additional reinforcing member. Moreover, the film 5 can rapidly contact with the projections 37 when the film 5 moves transversely.

As a result, the transverse or vertical movement of the film 5 due to the movement of the fuel in the tank 1 is restricted. Further, the projections 37 are formed from the mounting portion 8 to the bottom wall 3c adjacent to each other so that recesses are formed between the projections 37. The recesses house the corrugated portions 5b of the film 5. Therefore, the movement of the film 5 due to the fuel movement is suppressed. As a result, no large load or stress is produced in or acts on the film 5, and the film 5 is prevented from being broken. Further, the projection 37 decreases the air volume between the fuel surface and the film 5. Therefore, the amount of vapor in the fuel chamber 7 is kept small.

A refueling operation according to the first embodiment will be explained. First, the cap 14 is removed from the upper opening 13a of the refuel pipe 13. When the cap 14 is removed, the shut-off valve 17 is kept closed to prevent vapor from being discharged from the opening 13a of the pipe 13 to the atmosphere. Then, a fuel-nozzle (not shown) is inserted into the opening 13a of the pipe 13 to open the shut-off valve 17 against the biasing force of the spring (not shown) of the shut-off valve 17. At this stage, the seal members 15 and 16 are in contact with the peripheral face of the fuel nozzle to further prevent the vapor from being discharged from the opening 13a of the pipe 13 to the atmosphere. Then, the refueling operation is started and the fuel nozzle supplies the fuel chamber 7 with the fuel via the refuel pipe 13.

When the amount of the fuel in the fuel chamber 7 is increased, the fuel surface moves up. The movement of the fuel surface moves the film 5 up. While the film 5 moves up, the film 5 is kept in sealed contact with the fuel surface and the volume between the fuel surface and the film 5 is kept almost zero so that the amount of the fuel vapour in the fuel chamber 7 is kept small.

The volume of the air chamber 6 becomes small while the film 5 moves up. As a result, the positive air chamber pressure gradually is increased. The positive air chamber pressure forces the film 5 toward the fuel chamber 7 to further keep the film 5 in sealed contact with the fuel surface. The PP relief valve 11 opens when the air chamber pressure exceeds the opening pressure of the PP relief valve 11. Therefore, the air chamber pressure as well as the fuel chamber pressure are kept at the opening pressure of the PP relief valve 11 once the PP relief valve 11 opens.

When the fuel surface moves up to the one end opening of the circulation pipe 23 to shut the same 23 off, the negative pressure generated around the fuel nozzle is rapidly increased. The fuel nozzle is designed to be automatically stopped by the large negative pressure generated in the refuel pipe 13 around the fuel nozzle. Therefore, when the fuel in the fuel chamber 7 shuts the circulation pipe 23, the refueling operation is stopped. Thus, the amount of fuel supplied to the fuel chamber 7 is determined by the level of the one end opening of the circulation pipe 23. In the first embodiment, the one and opening of the circulation pipe 23 is located adjacent to the mounting portion 8 so that the refueling operation continues until the fuel surface moves up to the mounting portion 8. Further, in the first embodiment, the refueling operation continues until the central face 5a of the film 5 becomes horizontal. Therefore, almost all the interior 4 in the tank 1 becomes the fuel chamber 7 so that the tank 1 can store a larger amount of the fuel therein.

When the fuel nozzle is removed from the refuel pipe 13 after the refueling operation is stopped, the shut-off valve 17 is closed. Then, the cap 14 is attached to the upper opening 13a of the refuel pipe 13.

The fuel surface gradually moves down while the amount of the fuel in the fuel chamber 7 decreases during driving. As a result, the film 5 moves down with the movement of the fuel surface, and the central portion 5a of the film 5 projects toward the fuel chamber 7 and the bottom wall 3c of the lower portion 3. The film 5 moves down with the central face thereof being kept in sealed contact with the fuel surface so that the amount of vapor in the tank 1 is kept small during driving. The small amount of vapor in the tank 1 may allow the size of the canister 26 to be reduced or eliminated.

While the film 5 moves down, the volume of the air chamber 6 is gradually increased. As a result, the air chamber pressure is gradually decreased. When the air chamber pressure becomes lower than the opening pressure of the NP relief valve 12, the NP relief valve 12 opens. Therefore, the air chamber pressure is kept at the opening pressure of the NP relief valve 12 once the NP relief valve 12 opens.

In the first embodiment, a thin wall or sheet film 34 is positioned in the fuel chamber 7. The sheet film 34 extends within the fuel chamber 7 and is spread almost over whole fuel chamber 7 to separate the fuel chamber 7 into an upper fuel volume 30 and a lower fuel volume 32. The sheet film 34 is mounted to the side wall of the lower portion 3 at the almost entire peripheral portion of the sheet film 34. The sheet film 34 has a number of pores therein to have a permeablity so that the fuel in the fuel chamber 7 can flow through the pores in the sheet film 34 between the upper and lower fuel volumes 32 and 34. Further, the sheet film 34 is made of a soft material so that the sheet film 34 can be deformed by the film 5 when the film 5 moves down according to the decrease of the amount of the fuel in the fuel chamber 7. Therefore, the sheet film 34 does not interfere with the film 5 to that the film 5 can move with the central portion 5a being in sealed contact with the fuel surface. The deformation of the sheet film means that the shape of the sheet film itself is deformed by the film 5 or the flow of the fuel.

Figure 3:
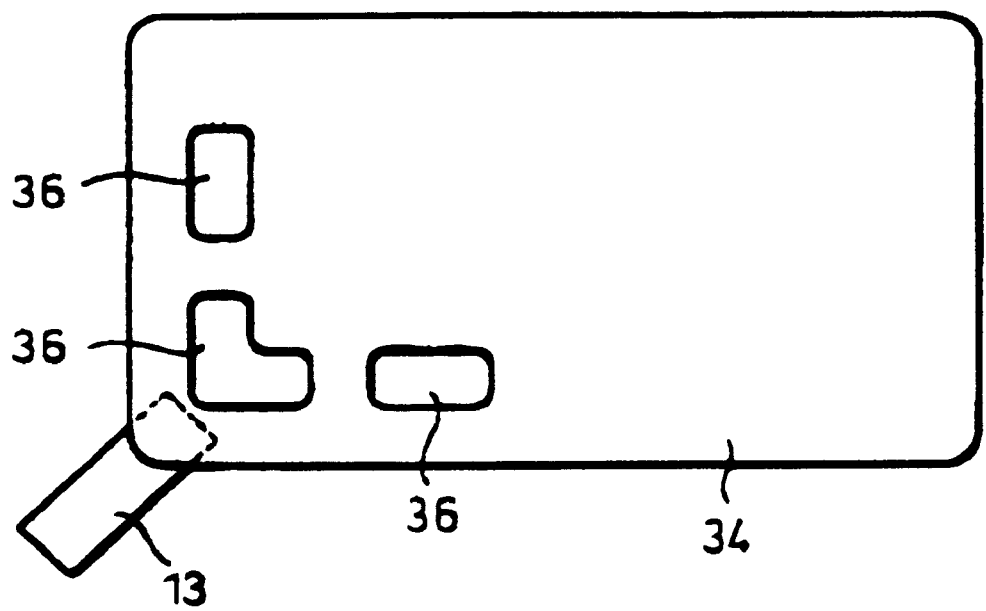
FIG. 3 is a plan view of a sheet according to the first embodiment of the invention.

Referring to FIG. 3, the sheet film 34 has three openings 36 adjacent the lower opening portion 13b of the refuel pipe 13. Each opening 36 is larger than the pore of the sheet film 34 so that a large amount of the fuel fed from the refuel pipe 13 during the refueling operation can easily flow to the upper fuel volume 30 through the openings 36.

The fuel flows or oscillates in the fuel chamber 7 during acceleration or turning of the vehicle. In the first embodiment, the flow or oscillation of the fuel is restricted by the sheet film 34. Therefore, the sheet film 34 acts as means or element for restricting or suppressing the flow or movement of the fuel. Moreover, the impact of the fuel on the film 5 is decreased by the sheet film 34. Further, the impact and the attachment of the film 5 onto the bottom wall of the lower portion 3 is restricted by the sheet film 34 since the shoot film 34 is positioned between the film 5 and the bottom wall of the lower portion 3. Note that the film 5 is not damaged by the sheet film 34.

Further, in the case that the fuel level sensor detects the amount of the fuel in the fuel chamber 7 by detecting the level of the film 5, the accuracy of the detection of the level of the film 5 is increased according to the first embodiment since the oscillation of the film 5 is restricted by the sheet film 34.

In the first embodiment, a net which is in the form of a grille may be used instead of the sheet film. Further, additional openings may be formed in the sheet film at portions where the effect of restricting the flow of the fuel is relative low, such as a peripheral portion of the sheet film or a central portion of the sheet film.

A tank according to the second embodiment will be explained, referring to FIG. 4.

Figure 4:
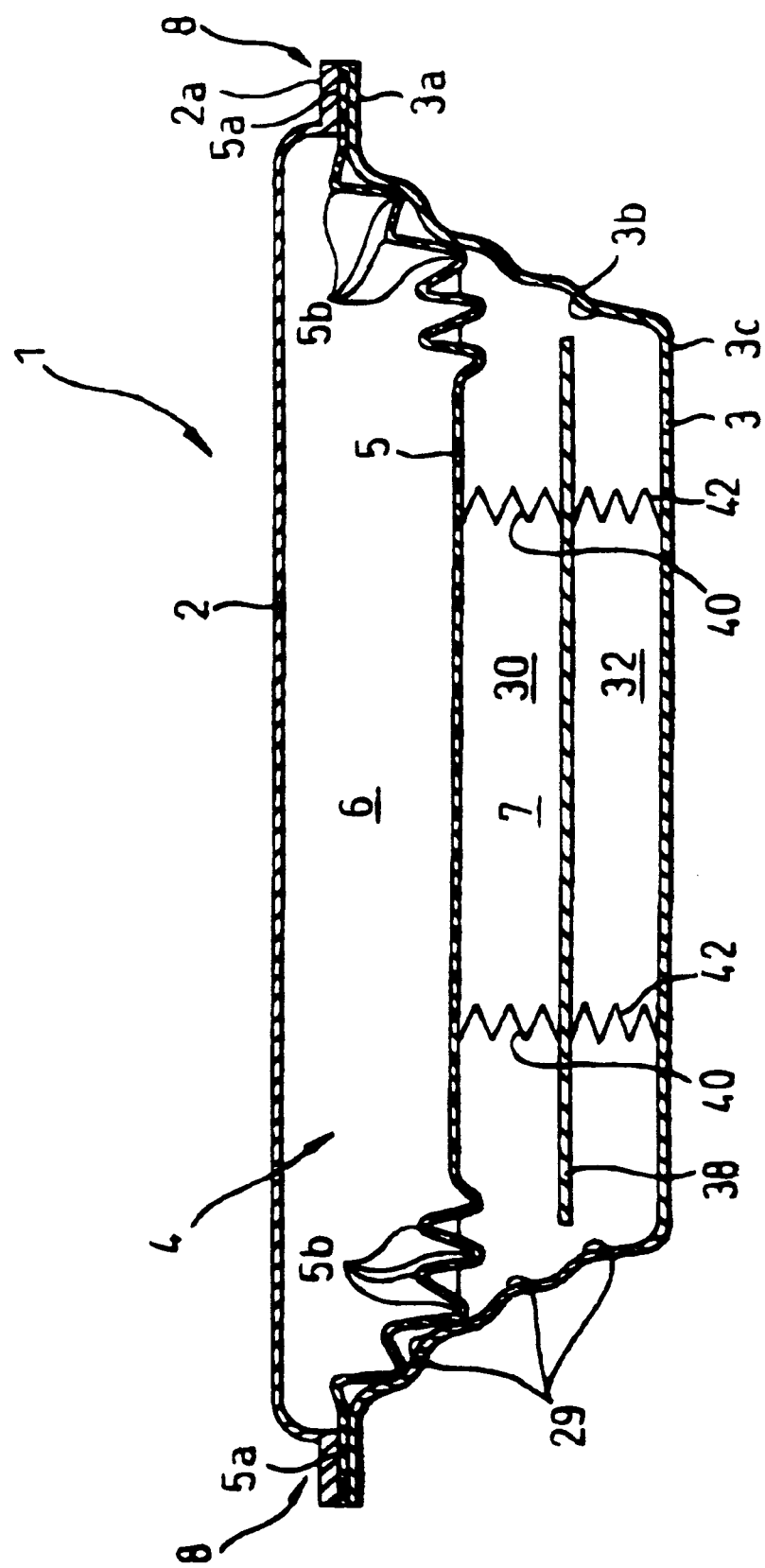
FIG. 4 is a aide view of a fuel tank according to the second embodiment of the invention.

Referring to FIG. 4, a thin wall or plate 38 is positioned in the fuel chamber 7 instead of the sheet film of the first embodiment. The plate 38 separates the interior of the fuel chamber 7 into the upper and lower volumes. The plate 38 has no permiablity. The plate 38 is resiliently supported by springs 40 and 42. One of the springs 40 connects an upper face of the plate 38 to the film 5.

The other spring 42 connects a lower face of the plate 38 to the bottom wall 3c of the lower portion 3. Therefore, the plate 38 can move down according to the downward movement of the film 5 with the plate 38 being away from the film 5 and the bottom wall of the lower portion 3. The structures and the functions, other than those described regarding the second embodiment, are the same as those of the first embodiment, and an explanation thereof will be eliminated.

The plate 38 can be moved by the flow or oscillation of the fuel in the fuel chamber 7. Therefore, the flow or oscillation of the fuel in the fuel chamber 7 is restricted by the plate 38. The plate 38 functions as means for restricting the movement of the fuel in the fuel chamber.

Further, the plate 38 is supported by the lower spring 42 so that the film 5 is not subject to damage due to the weight of the plate 38. To the contrary, the small weight of the plate 38 on the film 5 sealingly connects the film 5 to the fuel surface so that the volume of vapor in the fuel chamber 7 is kept small.

The plate is made of a material having no permiablity so that the effect of restricting the flow of the fuel in the fuel chamber is larger than that of the first embodiment.

In the second embodiment, another spring member may be used instead of the spring if the spring member does not interfere with the downward movement of the film. Further, a flexible member which does not interfere with the downward movement of the film may be suspended from the film instead of the plate.

A tank according to the third embodiment will be explained, referring to FIG. 5.

Figure 5:
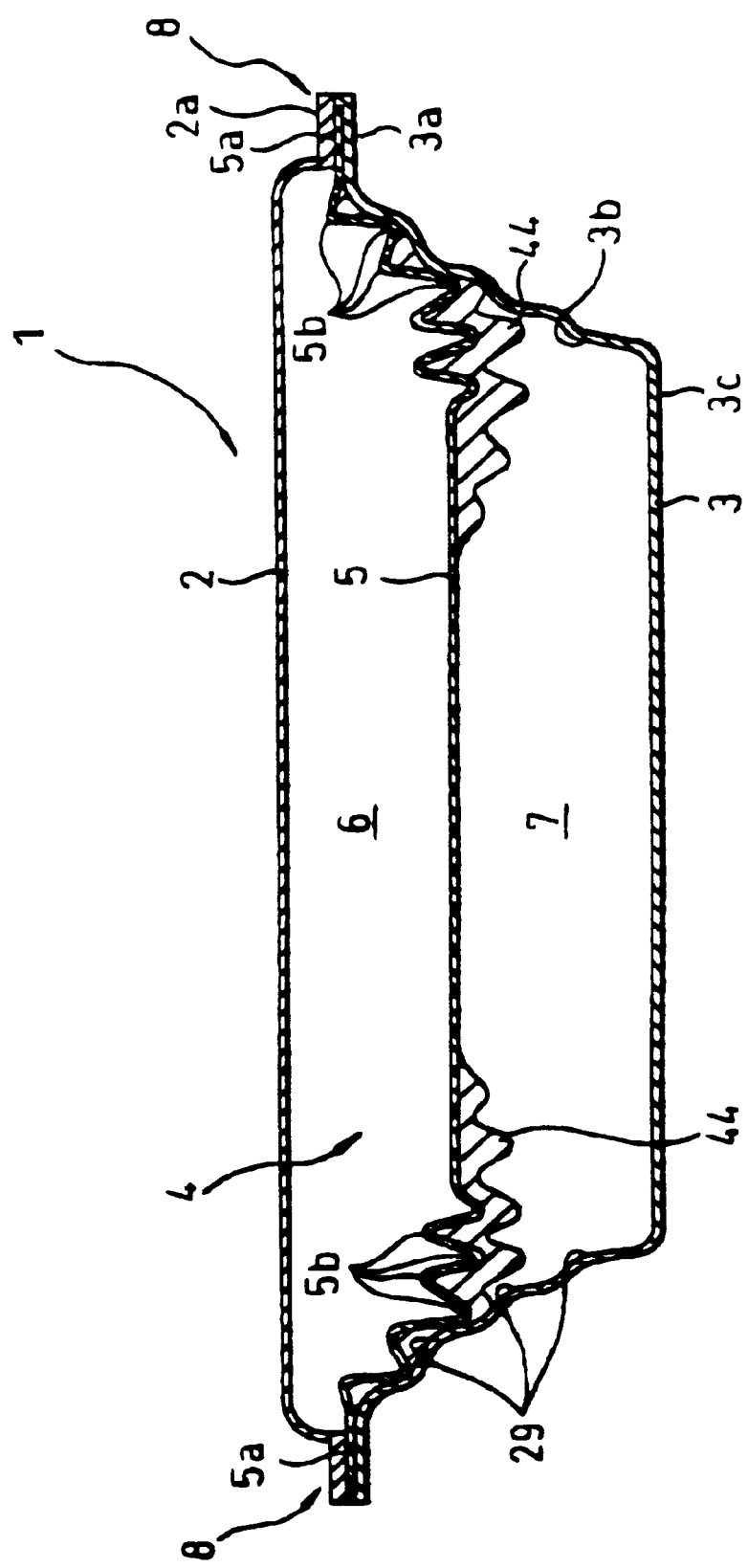
FIG. 5 is a side view of a fuel tank according to the third embodiment of the invention.
Figure 6:
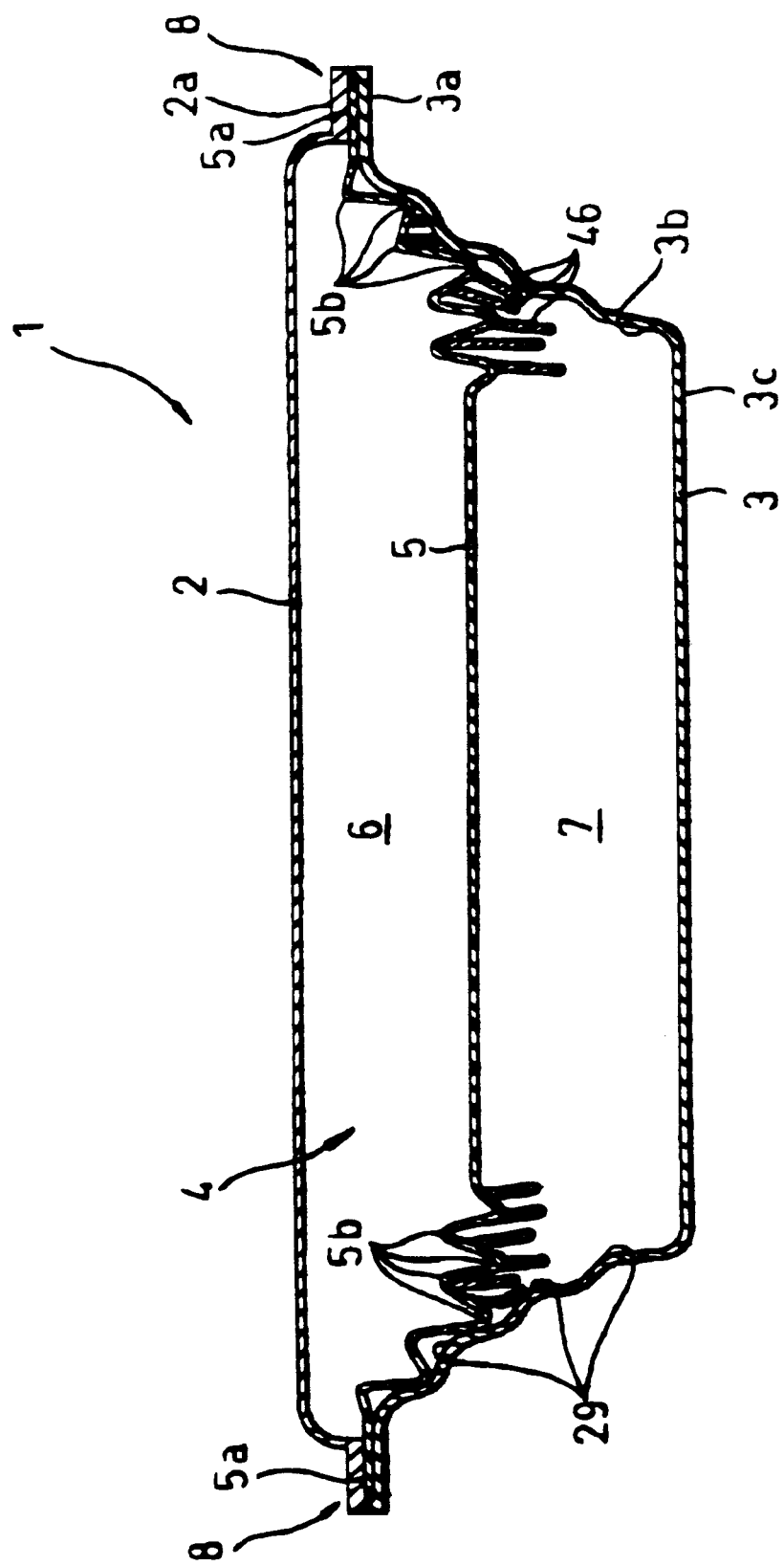
FIG. 6 is a side view of a fuel tank according to the fourth embodiment of the invention.

Referring to FIG. 5, sponge member 44 made of urethane foam is positioned on the lower face which has the corrugated portions 5b of the film 5 on the fuel chamber side, instead of the sheet film. The sponge member 44 can be deformed by the flow or oscillation of the fuel in the fuel chamber 7. Face of the sponge member 44 is shaped in the form of the wave. The structures and the functions other than those described regarding the third embodiment are the same as those of the first embodiment, and an explanation thereof will be eliminated.

According to the third embodiment, the flow or oscillation of the fuel is restricted by the sponge member 44. Further, the wave-shape face of the sponge member provides a wider area against which the fuel flow so that the impact force of the fuel against the sponge member 44 per unit surface area of the sponge member 44 is small. Therefore, the sponge member cannot be easily removed from the film by the flow of the fuel.

In the third embodiment, a member, having a complicated or entangled structure of resin filaments or strand, may be used as means for restricting the flow of the fuel in the fuel chamber instead of the sponge member. Preferably, the above member may be made of a material, such as polyethylene, polypropylene, polyamide or polyester, which can be welded on the film to weld the member to the film. Further, in the third embodiment, flexible fine may be attached to the film 5 instead of the sponge member.

Figure 7:
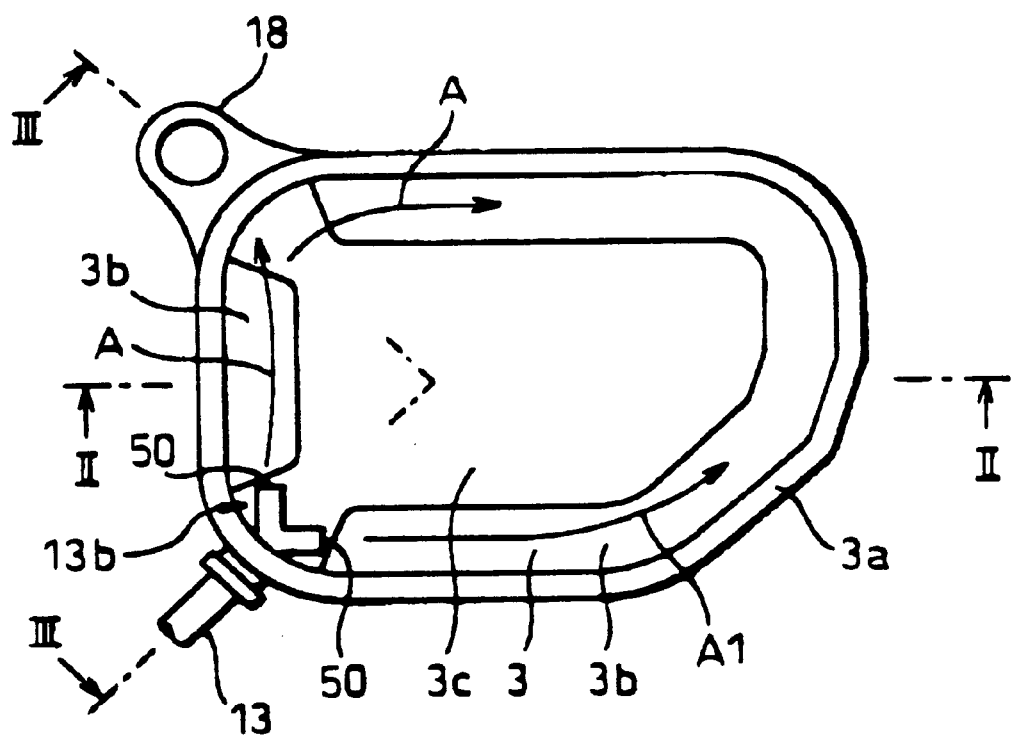
FIG. 7 is a plan view of a lower portion of a fuel tank according to the fifth embodiment of the invention.
Figure 8:
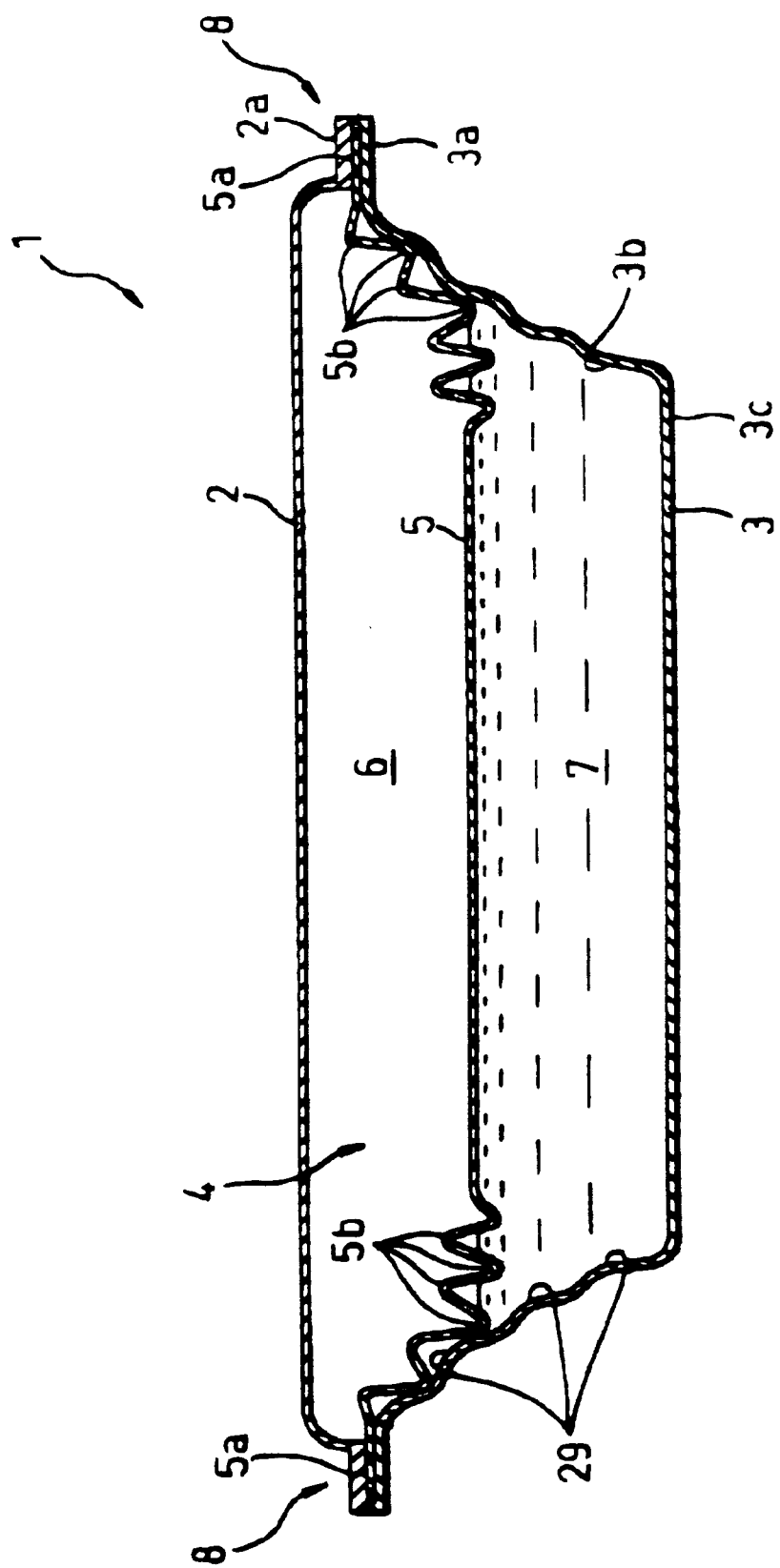
FIG. 8 is a cross sectional view of the fuel tank according to the fifth embodiment of the invention along the line II—II in FIG. 7.
Figure 9:
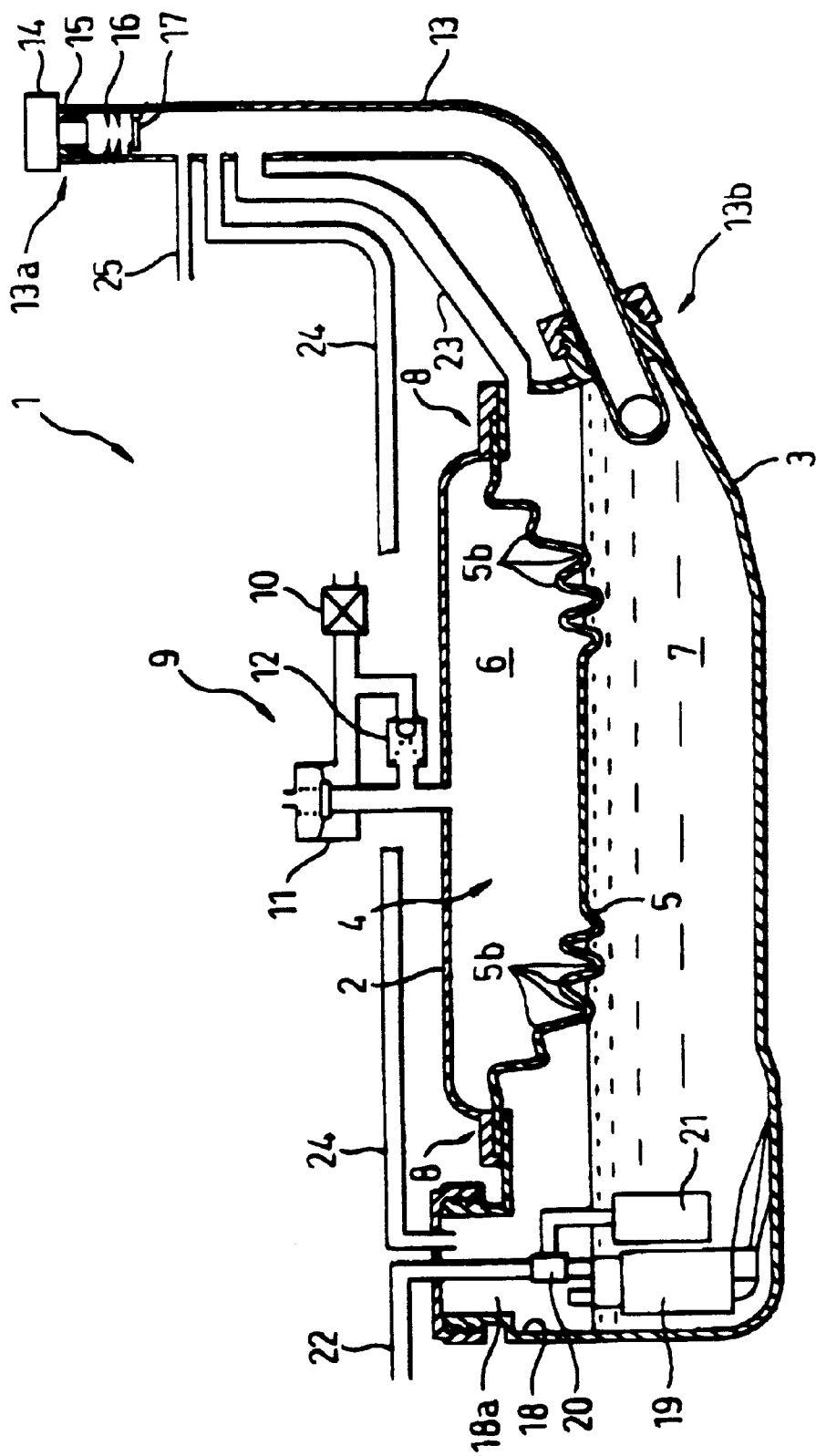
FIG. 9 is a cross sectional view of the fuel tank according to the fifth embodiment of the invention along the line III—III in FIG. 7.

A tank according to the fifth embodiment will be explained, referring to FIG. 7. Referring to FIG. 7, the lower opening portion 13b of the refuel pipe 13 has a two-legged pipe portion which has two openings 50 or a two-opening portion. The openings 50 direct toward spaces between the inner wall, i.e., the side wall 3b of the lower portion 3 and the film 5 so that the fuel fed from the refuel pipe 13 during the refueling operation is introduced into the spaces between the side wall 3b of 5 the lower portion and the film 5 in a direction parallel with the face of the film 5 along the side wall 3b of the lower portion 3 as the arrows A and A1. Therefore, the lower opening portion 13b of the fuel pipe 13 functions as means for restricting or changing the direction of the fuel fed from the refuel pipe 13 to the fuel chamber 7. The structures and the functions other than those described regarding the fifth embodiment are the same as those of the first embodiment, and an explanation thereof will be eliminated.

According to the fifth embodiment, the fuel fed from the refuel pipe 13 during the refuel operation does not impact against the film 5 to prevent the film 5 being broken. Further, according to the fifth embodiment, the flow resistance of the fuel during the refueling operation is kept small so that the fuel is easily fed into the fuel chamber during the refueling operation. Moreover, the formation of bubbles in the fuel in the fuel chamber is prevented so that the amount of vapor produced in the fuel chamber is kept small.

Further, according to the fifth embodiment, the amount of the fuel fed from each opening 30 of the lower opening portion 13b is kept smaller than that when the lower opening portion 13b has single opening so that the oscillation of the fuel in the fuel chamber kept small.

Further, according to the fifth embodiment, the oscillation of the fuel in the fuel chamber is kept small so that the film is generally kept horizontal while the film moves up according to the increase of the fuel in the fuel chamber. Therefore, the film is prevented from being broken.

A lower opening portion having a single opening or multiple openings directing toward the space between the inner wall of the lower portion 3 and the film 5 may be used.

Figure 11:
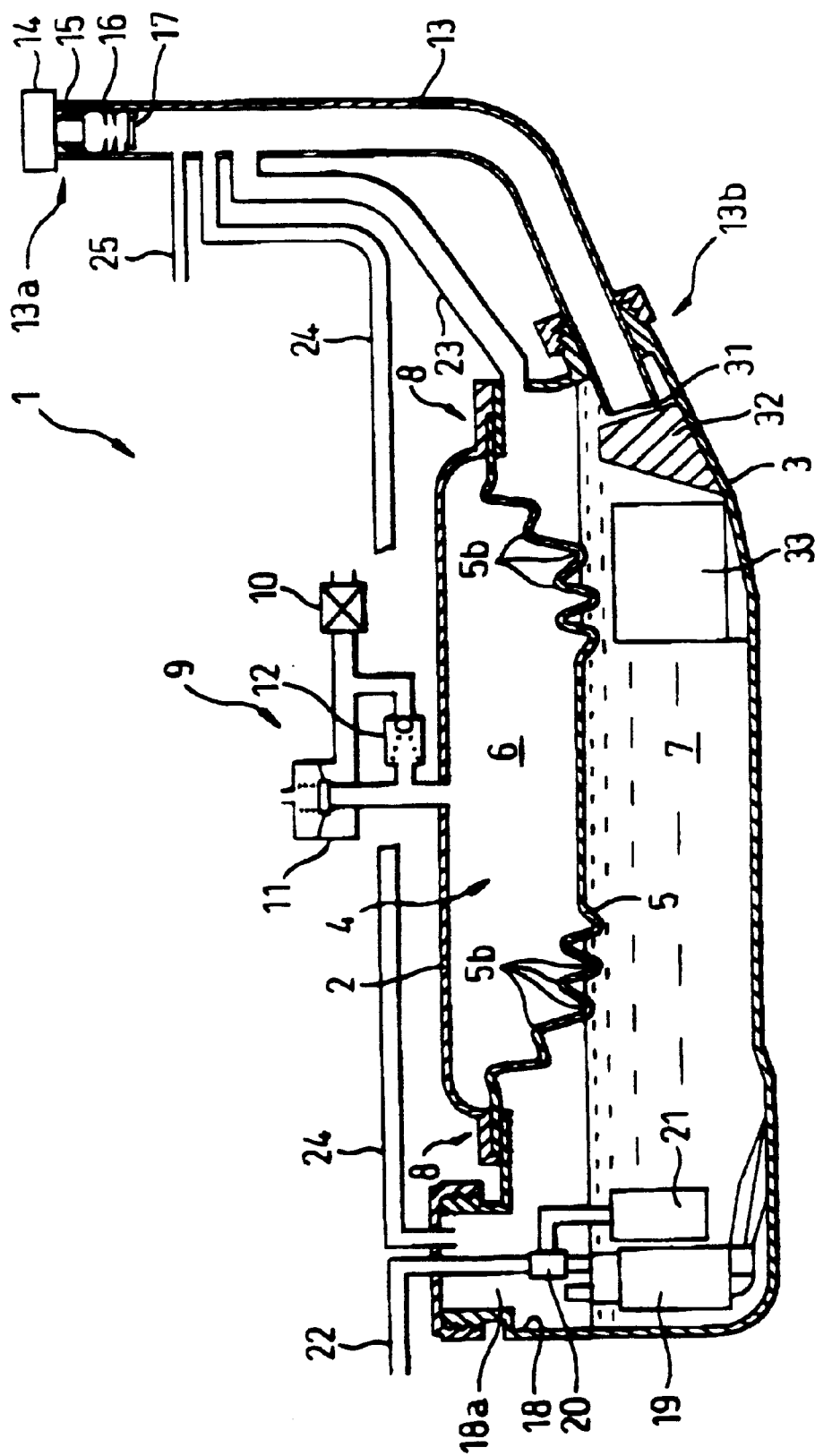
FIG. 11 is a cross sectional view of the fuel tank according to the sixth embodiment of the invention along the line V—V in FIG. 10.
Figure 12:
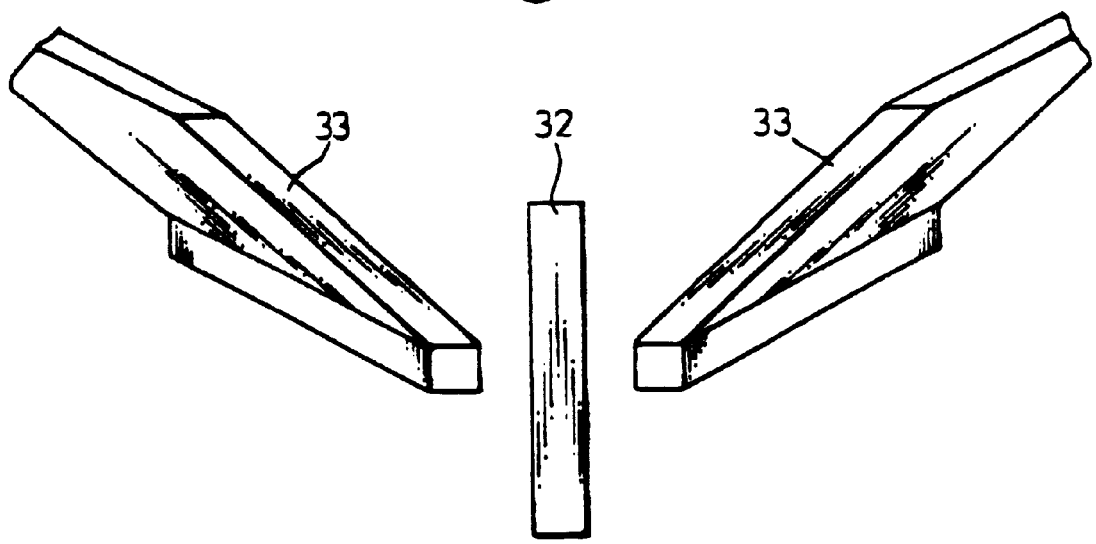
FIG. 12 is a view of the fuel tank according to the sixth embodiment of the invention along the line VI—VI in FIG. 10.

A tank according to the sixth embodiment will be explained, referring to FIGS. 10, 11 and 12. In the sixth embodiment, the lower opening portion 13b of the refuel pipe 13 has single opening 31 which generally directs toward the center of the tank 1. A vertical central panel 52 and two vertical side panels 33 are positioned on the bottom wall 3c of the lower portion 3 adjacent to the opening 31 of the lower opening portion 3b. The central panel 52 is located along the axis of the refuel pipe 13 at the lower opening portion 13b thereof. Further, the central panel 52 is located between the side panels 33.

The central panel 52 extends vertically from the bottom wall 3c of the lower portion 3. On the other hand, the side panels 33 extend from the bottom wall with an inclination along the side wall 3b of the lower portion 3. The positioning of the central and side panels is determined so that the panels do not interfere with the film which moves down. The structures and the functions, other than those described regarding the first embodiment, are the same as those of the first embodiment, and an explanation thereof will be eliminated.

Figure 10:
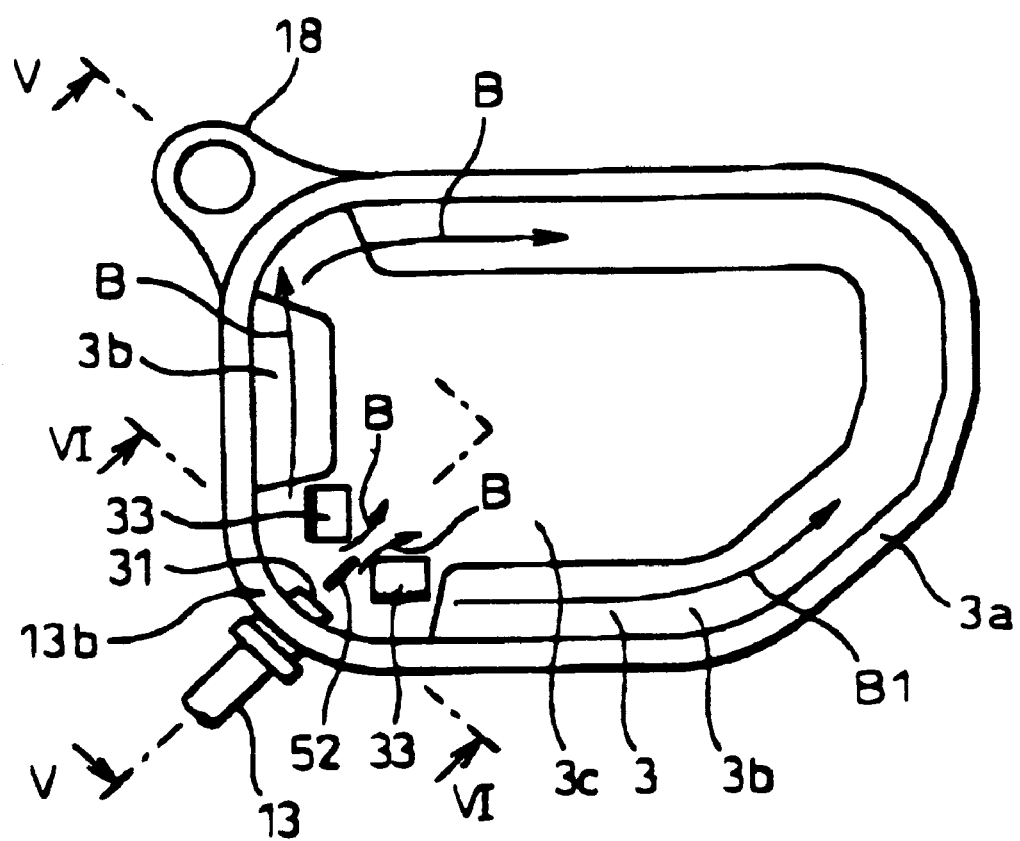
FIG. 10 is a plan view of a lower portion of a fuel tank according to the sixth embodiment of the invention.

According to the sixth embodiment, the fuel fed from the refuel pipe 13 during the refueling operation flows in the fuel chamber 7 in a direction parallel with the face of the film 5 as arrows B and B1 in FIG. 10. Therefore, the fuel fed from the refuel pipe 13 is introduced into the space between the inner wall of the lower portion 3 and the film 5 so that the oscillation of the fuel in the fuel chamber 7 is restricted. Thus, the panels function as means for restricting or changing the direction of the flow of the fuel, or means for dispensing the fuel from the refuel pipe in some directions.

A panel may be positioned on the lower opening portion 13b of the refuel pipe 13 so that the fuel fed from the refuel pipe 13 is introduced into the space between the inner wall of the lower portion 3 and the film 5.

In the sixth embodiment, the inner wall includes the side wall and the bottom wall of the fuel tank. Note that, according to the fifth to seventh embodiments, the space is formed between the inner wall of the side wall 3b of the lower portion and the film 5 when the central portion of the film is at the lower position in the tank.

Figure 13:
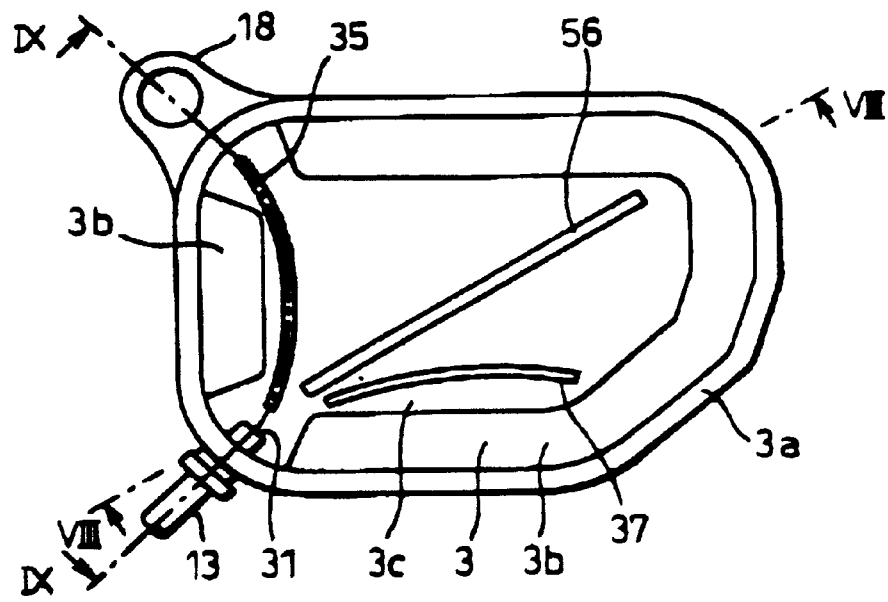
FIG. 13 is a plan view of a lower portion of a fuel tank according to the seventh embodiment of the invention.
Figure 14:
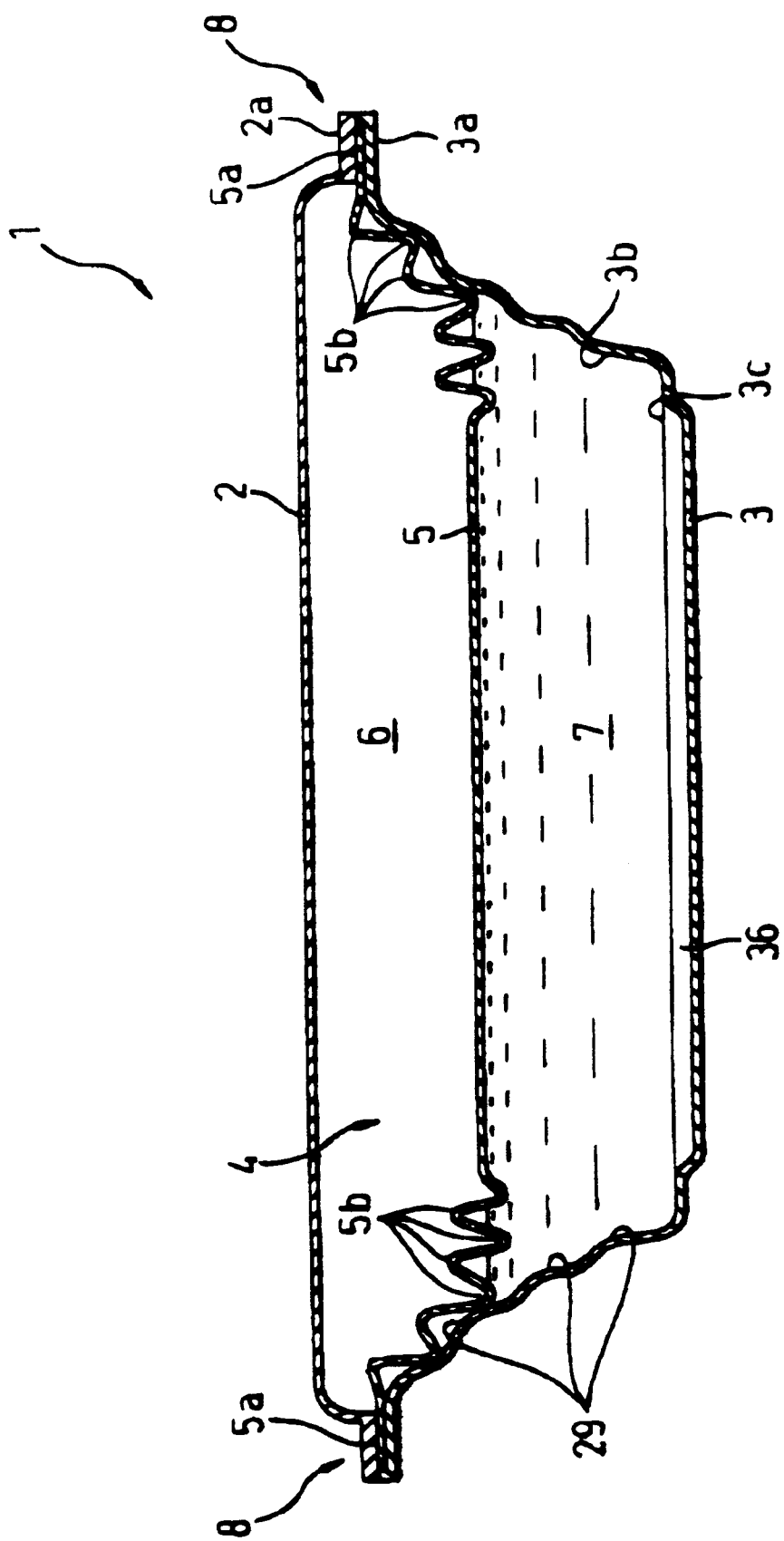
FIG. 14 is a cross sectional view of the fuel tank according to the seventh embodiment of the invention along the line VIII—VIII in FIG. 13.
Figure 15:
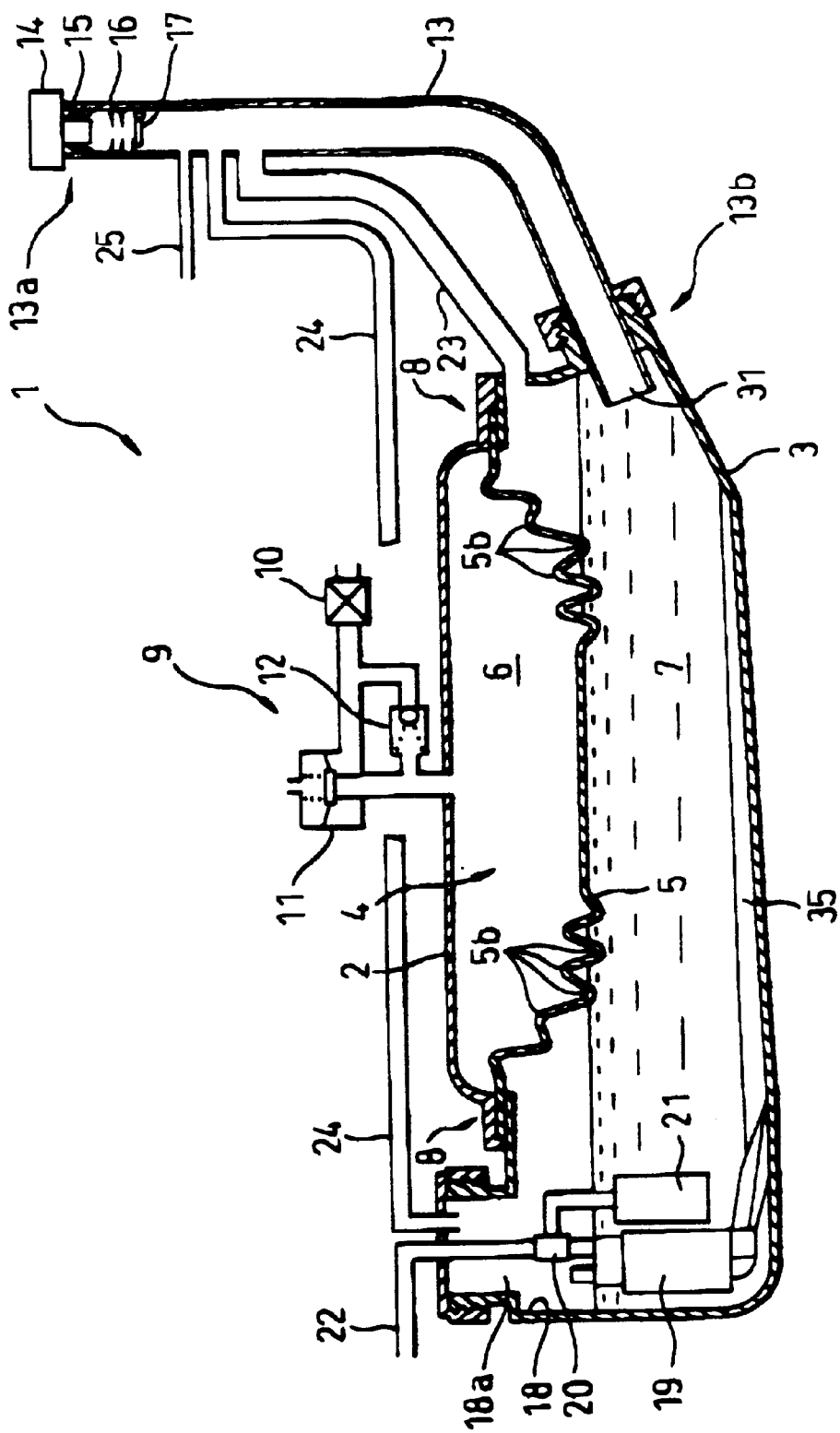
FIG. 15 is a cross sectional view of the fuel tank according to the seventh embodiment of the invention along the line IX—IX in FIG. 13.

A tank according to the seventh embodiment will be explained, referring to FIGS. 13, 14 and 15. The lower opening portion 13b of the refuel pipe 13 has a single opening 31 directed toward the center of the tank 1 and toward the space between the bottom wall of the lower portion 3 and the film 5. A central groove 56 and two side grooves 35 and 37 are formed in the bottom wall 3c of the lower portion 3. The central groove 56 extends straight from a position of bottom wall 3c adjacent to the lower opening portion 13b of the refuel pipe 13 to the side of the fuel tank opposite to the lower opening portion 13b. The side grooves 35 and 37 extend along the side wall 3b of the lower portion 3 from the position 3c adjacent to the lower opening portion 13b. One of the side groove 35 extends to the fuel pump chamber 18, and the depth thereof becomes deeper closer to the fuel pump chamber 18. The structures and the functions other than those described regarding the seventh embodiment are the same as those of the first embodiment, and an explanation thereof will be eliminated.

According to the seventh embodiment, the fuel fed from the refuel pipe 13 can flow away from the refuel pipe 1 through the space between the bottom wall 3c of the fuel tank 1 and the film 5 in a direction parallel with the face of the film 5 by the grooves 56, 35 and 37 during the refueling operation although the central portion of the film 5 is located at the lowest position in the fuel chamber 7. Therefore, the fuel fed from the refuel pipe 13 does not stay therearound so that the film 5 moves up with the central portion thereof being horizontal. Thus stress which moves the film 5 up occurs uniformly in the film 5 to prevent the film 5 breaking.

Further, according to the seventh embodiment, the groove 35 extends from the refuel pipe 35 to the position adjacent to the fuel pump chamber 18 so that the fuel fed from the refuel pipe 35 is introduced to the fuel pump chamber 18 through the groove 35. The fuel introduced is decelerated in the fuel pump chamber 18, and then flows into the fuel chamber 7. That is, the fuel pump chamber 19 serves as means for decelerating the fuel. Therefore, the oscillation of the fuel in the fuel chamber 7 is restricted.

Further, according to the seventh embodiment, the side groove 35 becomes deeper away from the refuel pipe 35 toward the fuel pump chamber 18 so that the fuel fed from the refuel pipe 13 is easily introduced into the fuel pump chamber 18. The fuel introduced flows into the fuel chamber 7 after the speed of the fuel is reduced the fuel pump chamber 18. Therefore, the oscillation of the fuel in the fuel chamber 7 is restricted. Further, when there is a small amount of fuel in the fuel chamber 7, the fuel is easily gathered into the fuel pump chamber 18. Therefore, the fuel can be pumped by the pump 19 even though there is only a small amount of the fuel in the fuel chamber 7.

In the seventh embodiment, pipes positioned on the bottom wall of the lower portion may be used as the fuel passages instead of the grooves.

Also, in the seventh embodiment, the two-legged pipe of the fifth embodiment or the panels of the sixth embodiment may be employed.

Note that, according to the fifth to seventh embodiments, the space is formed between the inner wall of the side wall 3b of the lower portion and the film 5 when the central portion of the film is at the lower position in the tank.

Figure 16:
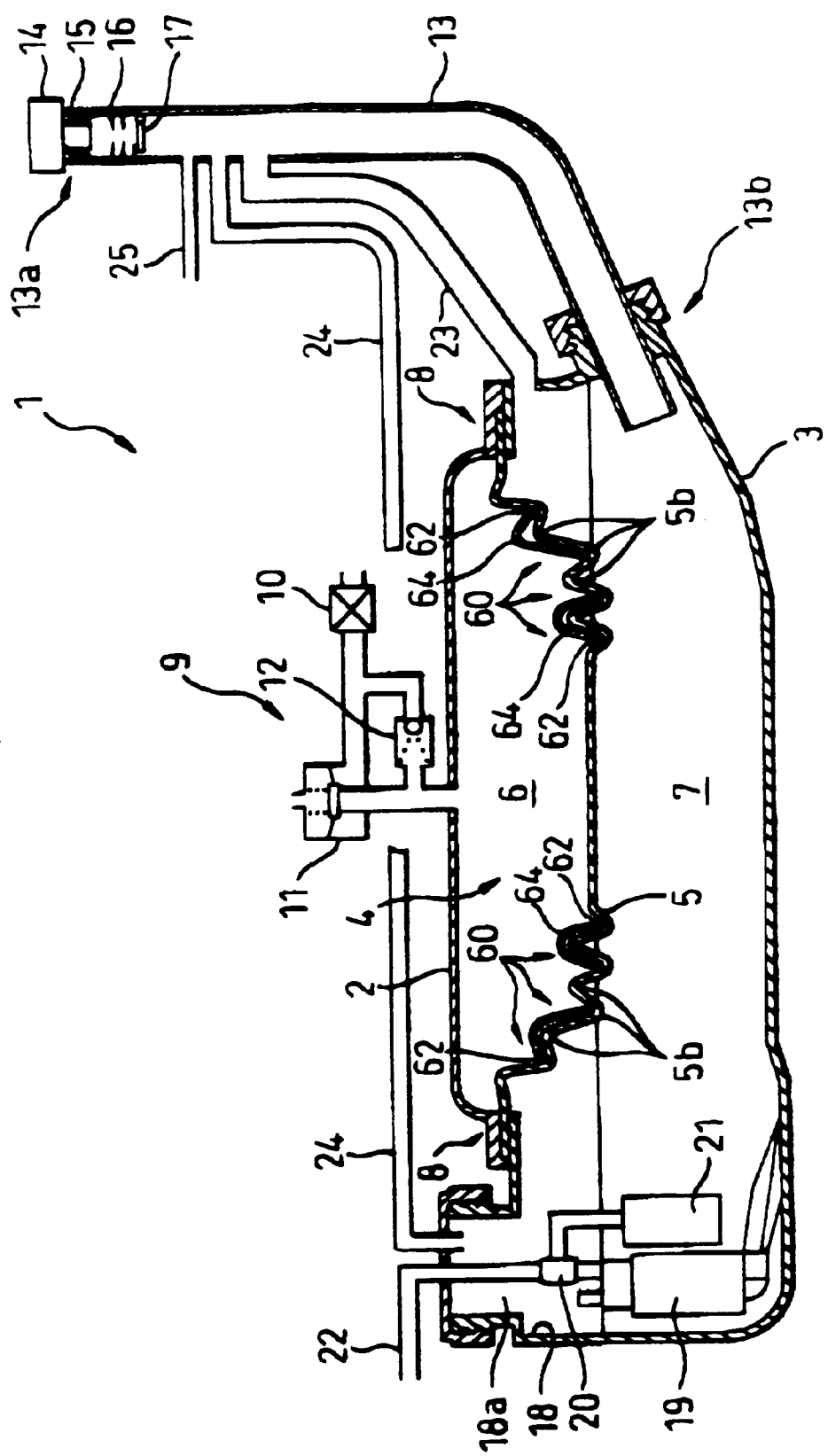
FIG. 16 is a cross sectional view of the fuel tank according to the eighth embodiment of the invention.
Figure 17:
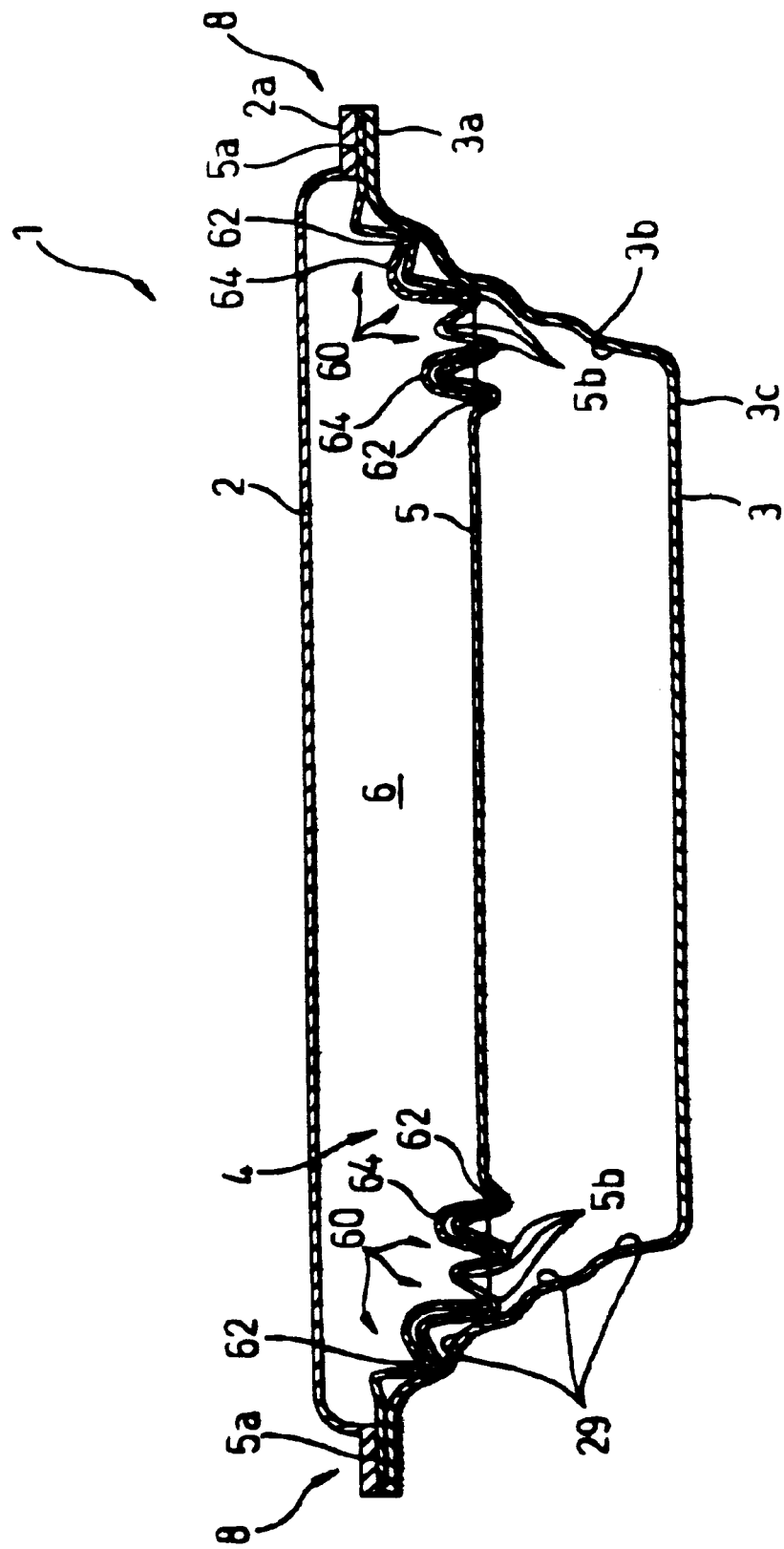
FIG. 17 is a cross sectional view of the fuel tank according to the eighth embodiment of the invention.
Figure 18:
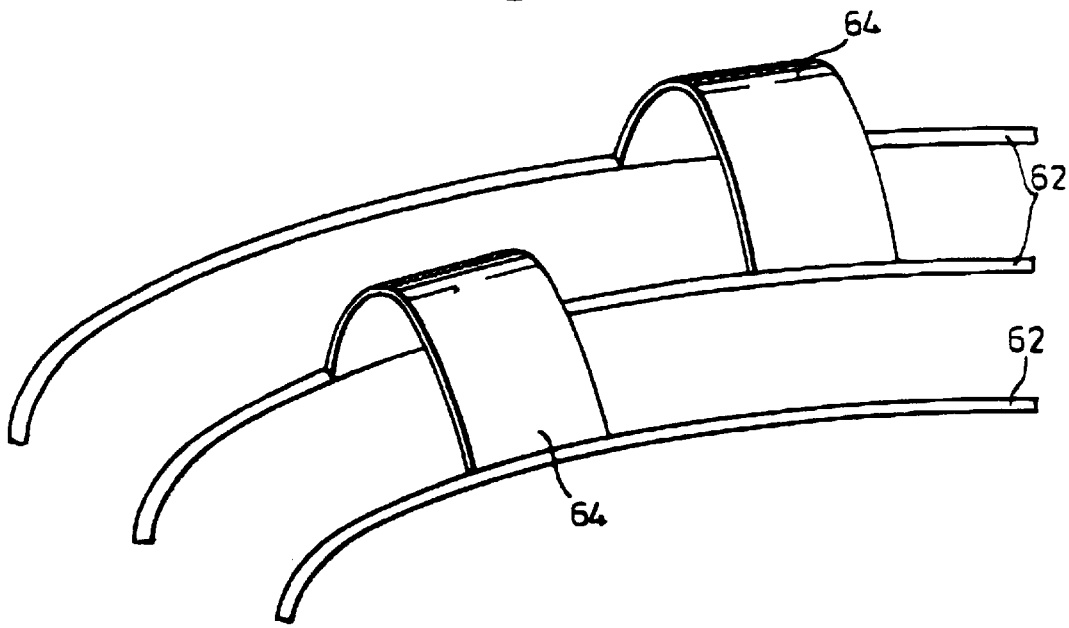
FIG. 18 is a perspective view of rods and bridge members of the fuel tank according to the eighth embodiment of the invention.
Figure 19:
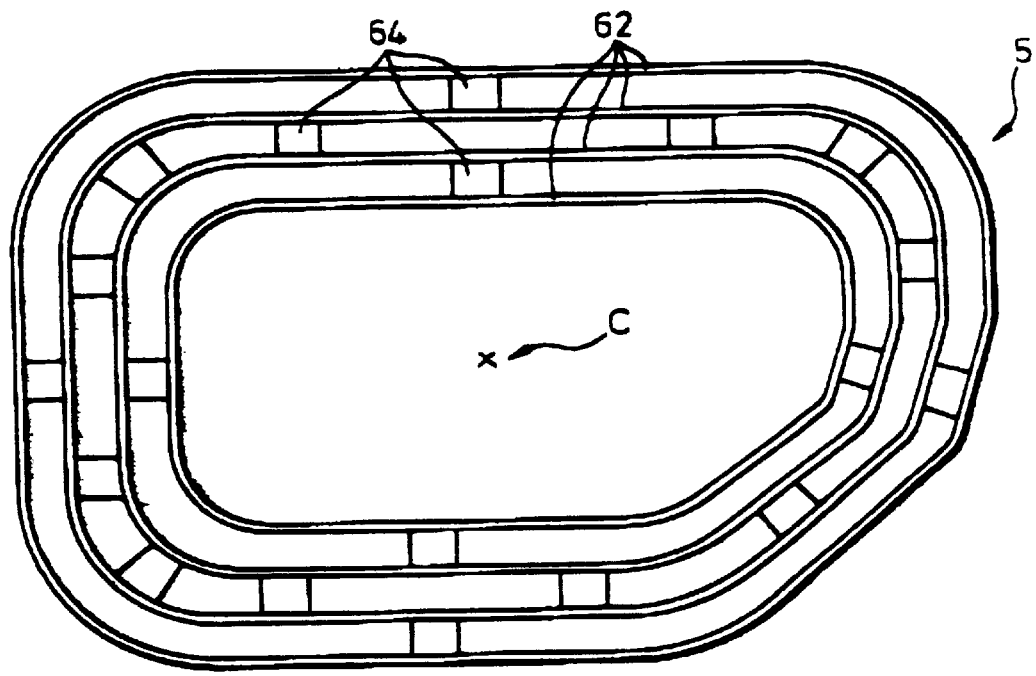
FIG. 19 is a plan view of rods and bridge members of the fuel tank according to the eighth embodiment of the invention.

A tank according to the eighth embodiment will be explained, referring to FIGS. 16 to 19. Referring to FIGS. 16 and 17, annular rods 62 are positioned on annular folded recess portions 60 of the corrugated portion 5b of the film 5 on the air chamber side. The rods 62 serve as means for reinforcing the recess portion 60 of the corrugated portion 5b. Therefore, when the fuel impacts against the corrugated portions 5b of the film 5, the depression of the recess portions 60 toward the air chamber side is restricted. Therefore, the rods 62 also serve an means for controlling the deformation of the film 5.

The rod 62 is connected to adjacent rods 62 via thin flat sheet bridge members 64 made of the resilient material. The bridge member 64 has a curved shape, and extends between the recess portions 60 over the top of the corrugated portion 5b on the air chamber side. Further, the bridge members 64 are uniformly positioned relative to the center c of the film 5. It is preferable that the bridge members 64 are positioned on the corners of the corrugated portions 5b which has a large possibility of being unusually deformed due to the oscillation of the fuel. The structures and the functions other than those described regarding the first embodiment are the same as those of the first embodiment, and an explanation thereof will be eliminated.

According to the eighth embodiment, the rods 62 are regularly spaced apart from each other by the bridge members 64. If, in a part of the area of the corrugated portions, a corrugated portion is far away from the adjacent corrugated portion, the top line of the corrugated portion may be dented by the impact of the fuel flow, and thereafter, the film 5 cannot be folded along the dented top line of the corrugated portion.

Further, according to the eighth embodiment, the bridge members 64 expand the film 5 so that the volume of the air chamber 6 is kept large. Therefore, the film 5 is kept in sealed contact with the fuel surface so that the production of a large amount of fuel vapor is restricted.

Note that the bridge members 64 do not bias the rods 62 vertically, i.e., in the direction of an increase of the fuel in the tank, so that the rods 62 can move vertically.

Generally straight rods may be partially positioned in the recess portions of the corrugated portions 5b instead of the annular rods of the eighth embodiment. Further, the annular rods and the bridge members may be positioned on the fuel chamber side. In this case, the rods and the bridge members are made of a material which will not be influenced by the fuel in regard to the physical features thereof. Further, the rods may be positioned on the top of the corrugated portions.

Figure 20:
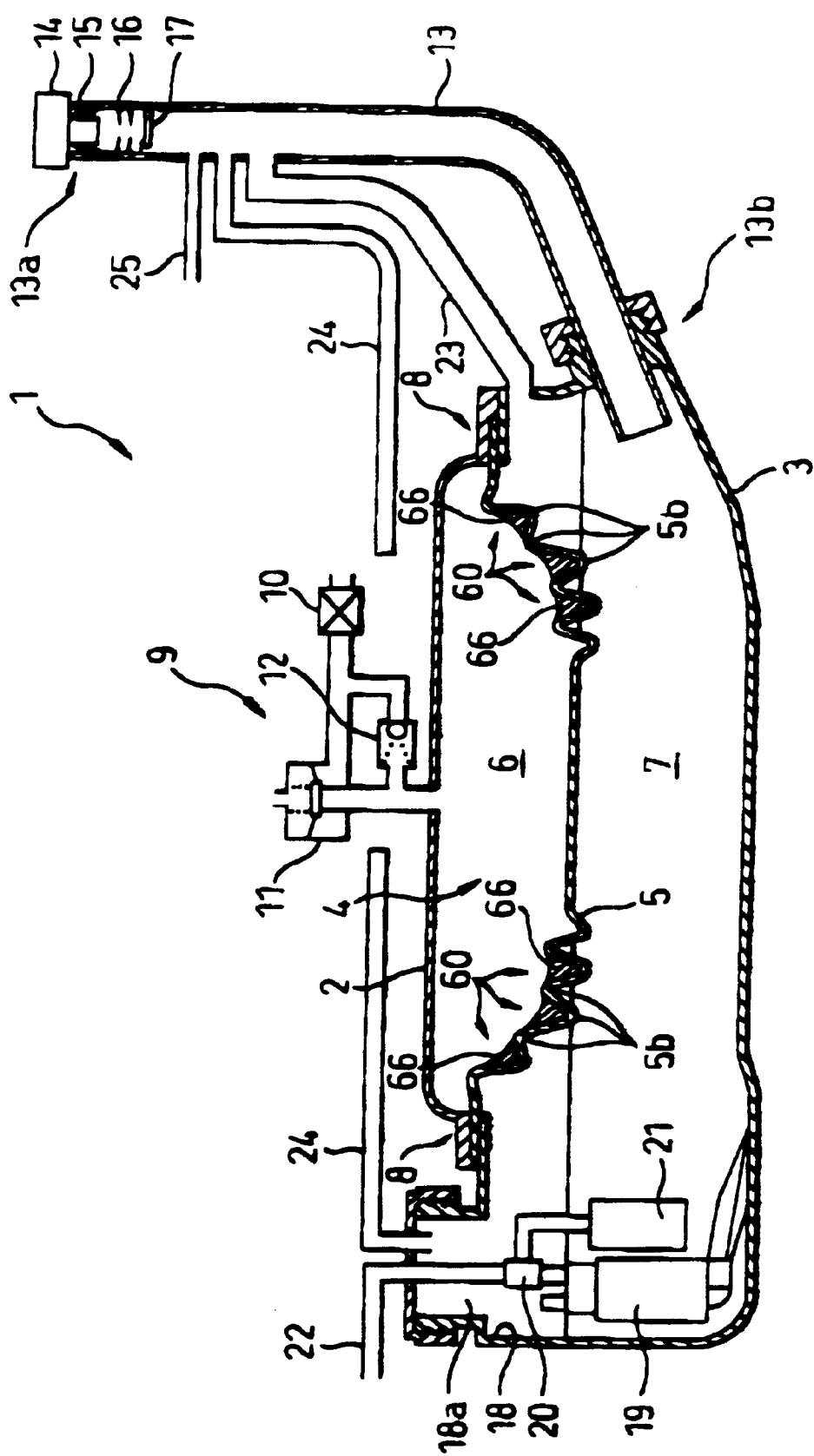
FIG. 20 is a cross sectional view of the fuel tank according to the ninth embodiment of the invention.

A tank according to the ninth embodiment will be explained, referring to FIG. 20. Referring to FIG. 20, the recess portions 60 of the film 5 on the air chamber side are filled with urethane foam members 66 which are resilient. The structures and the functions other than those described regarding the first embodiment are the same as those of the first embodiment, and an explanation thereof will be eliminated.

According to the ninth embodiment, the urethane foam members 66 reinforce the film 5 and keep the corrugated portions 5b regularly spaced apart from each other. Therefore, an unusual deformation of the film 5 is restricted.

Further, according to the ninth embodiment, the filling of the recess portions with the urethane foam members is carried out more easily than the assembly of the rods and the bridge members according to the eighth embodiment.

In the ninth embodiment, the recess portions may be partially filled with the urethane foam members to decrease the addition of the weight to the film. In this case, it is preferable that the urethane foam members are uniformly located relative to the center of the film.

In the above embodiments, the film 5 is mounted at the upper position in the tank 1 and projects its central area downwardly, toward the fuel chamber 7, when the amount of the fuel in the fuel chamber 7 decreases. However, the film 5 may be mounted at the lower position in the tank 1 and project its central area upwardly toward the air chamber 6 when the amount of the fuel in the fuel chamber 7 increases. In this case, the entire face of the film 5 can contact the fuel in the fuel chamber 7. Therefore, the air volume formed in the fuel chamber 7 is kept very small. Thus, the amount of vapor in the fuel chamber 7 is kept very small.

Further, the film may be formed as a bag which is made of inflatable material. In this case, an air chamber is formed in the bag, and the fuel chamber is formed by the inner wall of the tank and the outer face of the bag.

While the invention has been described by reference to specific embodiments chosen for purposes of illustration, it should be apparent that numerous modifications can be made thereto by those skilled in the art without departing from the basic concept and scope of the invention.

I claim:

1. A fuel tank comprising:

a fuel tank interior enclosed by a tank enclosure;

a separator wall which is connected to the tank enclosure and separates an interior of the fuel tank into an air chamber and a fuel chamber, said separator wall being deformed according to an amount of fuel in said fuel chamber while said separator wall is in contact with a surface of the fuel in the fuel chamber, a refuel pipe connected to said fuel chamber to supply said fuel chamber with fuel, and a fuel flow changing element that changes the direction of a flow of the fuel fed from said refuel pipe and that prevents the flow of the fuel from impacting against the separator wall, when the separator wall collapses towards a bottom portion of the tank enclosure.

2. A fuel tank according to claim 1, wherein said fuel flow changing element has an introduction pipe connected to said refuel pipe, and said introduction pipe introduces the fuel fed from said refuel pipe into said fuel chamber in a direction parallel with a face of said separator wall.

3. A fuel tank according to claim 2, wherein said introduction pipe comprises a multi-opening portion at an opening thereof on the fuel chamber side, and said multi-opening portion introduces and dispenses the fuel fed from the refuel pipe into said fuel chamber in the direction parallel with said face of said separator wall.

4. A fuel tank according to claim 1, wherein said fuel flow changing element is comprised of at least one plate arranged near an opening of said refuel pipe on the fuel chamber side, and said plate introduces the fuel fed from said refuel pipe into said fuel chamber in a direction parallel with a face of said separator wall.

5. A fuel tank according to claim 1, wherein said fuel flow changing element is comprised of at least one groove formed in a bottom wall of said fuel tank, said groove extends from a portion of said bottom wall near an opening of said refuel pipe on the fuel chamber side to a portion of said bottom wall away from said opening of said refuel pipe, and said groove introduces the fuel fed from said refuel pipe into said fuel chamber in a direction parallel with a face of said separator wall.

6. A fuel tank according to claim 5, wherein said groove becomes deeper away from said portion of said bottom wall near said opening of said refuel pipe.

7. A fuel tank according to claim 2, wherein said fuel flow changing element is comprised of at least one groove formed in a bottom wall of said fuel tank, said groove extends from a portion of said bottom wall near an opening of said refuel pipe on the fuel chamber side to a portion of said bottom wall away from said opening of said refuel pipe, and said groove introduces the fuel fed from said refuel pipe into said fuel chamber in a direction parallel with a face of said separator wall.

8. A fuel tank according to claim 7, wherein said groove becomes deeper away from said portion of said bottom wall near said opening of said refuel pipe.

9. A fuel tank according to claim 3, wherein said fuel flow changing element is comprised of at least one groove formed in a bottom wall of said fuel tank, said groove extends from a portion of said bottom wall near an opening of said refuel pipe on the fuel chamber side to a portion of said bottom wall away from said opening of said refuel pipe, and said groove introduces the fuel fed from said refuel pipe into said fuel chamber in a direction parallel with a face of said separator wall.

10. A fuel tank according to claim 9, wherein said groove becomes deeper away from said portion of said bottom wall near said opening of said refuel pipe.

* * * * *